United States Patent [19]

Spinosa et al.

[11] 4,316,734
[45] Feb. 23, 1982

[54] REMOVING INCLUSIONS

[75] Inventors: Emilio D. Spinosa, Upper Arlington; Dale Ensminger, Columbus, both of Ohio

[73] Assignee: Battelle Memorial Institute, Columbus, Ohio

[21] Appl. No.: 126,797

[22] Filed: Mar. 3, 1980

[51] Int. Cl.$^3$ .............................................. C03B 5/16
[52] U.S. Cl. ...................................... 65/135; 65/134; 55/15
[58] Field of Search ...................... 65/134, 135, , 136; 55/15

[56] References Cited

U.S. PATENT DOCUMENTS

| | | | |
|---|---|---|---|
| 2,635,388 | 4/1953 | Peyches et al. | 65/136 |
| 3,151,958 | 10/1965 | Bodine | 55/15 |
| 3,284,991 | 11/1966 | Ploeger et al. | 55/15 |
| 3,904,392 | 9/1975 | Van Ingen et al. | 55/15 |

FOREIGN PATENT DOCUMENTS 458893 12/1936 United Kingdom .................... 55/15

OTHER PUBLICATIONS

Ultra-Sonic Engineering, A. E. Crawford pp. 230–233, Academic Press Inc.

Primary Examiner—Arthur D. Kellogg
Attorney, Agent, or Firm—Dunson Philip M.

[57] ABSTRACT

A method of removing gaseous inclusions from a highly viscous liquid (10) that comprises applying sonic energy, as by means of acoustic horns (11), or other suitable acoustic source, in the liquid (10) at an energy intensity sufficient to induce migration and coalescence of the inclusions in the liquid (10), and less than that required to produce substantial cavitation therein, until the volume density of the inclusions has been reduced to a desired level. Typically the frequency and the energy intensity are selected, and adjusted if necessary, to provide a mode of operation whereby the liquid (10) is subjected to a cyclic component of stress that causes bubbles to collide and form larger bubbles, and to a substantially unidirectional component of stress, due to viscous losses and other mechanisms occuring in an acoustic field (e.g. radiation pressure), that tends to drive the growing bubbles away from the source (11) of the sonic energy and thus to facilitate their movement toward the surface (13) of the liquid (10) and the environs.

9 Claims, 2 Drawing Figures

REMOVING INCLUSIONS

FIELD

This invention relates to removing gaseous inclusions from highly viscous liquids. It is especially advantageous in reducing the amount of energy used in the refining of glass.

A major portion of the energy required to produce articles from molten galss is expended for removing small gaseous inclusions called seeds. The energy expenditure is required to reduce the viscosity of the melt to a value at which the seeds can rise from the natural buoyant forces. With the application of sonic energy, the small seeds can be caused to coalesce into larger bubbles that buoyantly rise at a faster rate with no change in the melt viscosity. Consequently, the viscosity can be increased, by decreasing the temperature, so that the larger bubbles can rise at a rate equivalent to that of the original seeds. The decrease in melt temperature leads directly to an energy saving. Alternatively, the throughput rate of the glass melting unit can be increased without a corresponding increase in the energy input.

Liquids can be degassed by supplying sufficient acoustic energy to cause cavitation. During the cavitation process, gases are removed from solution, tiny bubbles are caused to coalesce by migration through ruptures and by collisions, both caused by the cavitation. The large bubbles rise through buoyancy. The cavitation method, though effective, requires very high energy intensities, so its use is limited to small quantities when applied to highly viscous materials such as glass. Although some very local cavitation may exist to benefit the operation of the present invention, it is not the basic principle on which the invention is founded. To apply sufficiently high intensities to degas by cavitation, molten glass in the conventional glass making system would require excessively large expenditures of energy, extremely complex and expensive equipment, and expensive maintenance. The expensive maintenance would result from rapid erosion of the radiating components under the severe conditions of stress associated with cavitation.

Commonly the use of acoustic energy in degassing liquids, especially low viscosity materials, involves the influence of standing waves on particles within the acoustic field. Standing acoustic waves are characterized by sinusoidally varying stress gradients between displacement nodes and antinodes. Stress differentials and momentum cause particles and bubbles to migrate to displacement nodes where they coalesce and remain until either buoyant forces due to size of the bubbles, allow them to break free and rise to the surface, or the field is removed. The intensities of energy applied in utilizing the principle of standing waves to degas liquids are much lower than those associated with cavitation. In fact, cavitation is detrimental to a standing wave; i.e., as the amount of cavitation increases, the establishment of a standing wave becomes more difficult. However, standing waves of greater than a few half-wavelengths are very difficult to obtain in highly viscous liquids, because the high viscosity causes high attentuation of an acoustic wave. The distance over which a standing wave may be obtained in a viscous liquid decreases as the viscosity increases.

A small amount of cavitation and a weakly reinforced wave, due to in-phase reflections of energy, may exist and are even desirable during the application of the present invention. However, the main feature of the invention which makes it applicable to treating large volumes of molten glass is a unidirectional force on the seeds brought about by the high attenuation of acoustic energy and other mechanisms occurring in an acoustic field. That attenuation is associated with high viscosities such as those encountered in molten glass. Acoustic waves are stress waves. The acoustic radiators energize the liquid within their immediate vicinity with high-intensity cyclic stresses. As these waves move away from the radiators, the stress levels decrease, partially from spreading; but the majority of the decrease is caused by absorption at the high viscosities of the glass. As a result, the glass is subjected to both a cyclic component of stress which has the localized effect of jostling bubbles together and to a unidirectional component of stress, due to viscous losses and other mechanisms occurring in an acoustic field, which tends to force the growing bubbles from the radiating surfaces. The result is a fairly rapid removal of seeds at a minimal expenditure of energy.

The physics involved is quite complex. In liquids, the major forces on a bubble are lumped under the term radiation pressure. The radiation pressure is a function of intensity of the acoustic wave. It forces the small bubbles toward nodal regions and large bubbles toward anitnodal regions. Another factor is pressure gradients, which are characteristic of a sound wave. Acoustic streaming is a unidirectional flow of fluid which will sweep bubbles with it. Acoustic streaming is caused by radiation pressure in an absorbing liquid, in which there is an exponential drop of energy density along the axis of an acoustic beam. The resulting unidirectional motion is determined by the equilibrium between a driving force proportional to attenuation (as a function of both compressional and shear viscosity) and a retarding force which is proportional to shear viscosity. This is a minimal effect in our application, i.e. it moves the bubbles in unison but not necessarily toward each other.

The efficacy of the novel application of acoustic energy has been demonstrated in a medium with low temperature viscosity (room temperature to 60 C.) equivalent to that of molten glass at 1500 C. The important or controlling parameters are: (1) The design of the sonic horn or radiator. (2) The frequency of the acoustic field. (3) The energy of the acoustic field. (4) The positioning of the horns or other sources of acoustic energy. (5) The viscosity of the melt. (6) The throughput rate of the viscous medium. The influences of some of the parameters are interrelated as is indicated by the results of the experiments described herein.

BACKGROUND

Previous efforts in the field of improving the removal of gaseous inclusions in glass melts have included the application of ultrasonics. The early work was done in small crucibles of molten glass or of a viscous medium, usually gylcerine. These efforts showed that ultrasonics probably could help to remove the gaseous inclusions. However, the encouraging results have never been pursued in a manner which is applicable to large glass-melting tanks as is indicated by the lack of follow-on studies in the open literature. Our own study indicates that the application of ultrasonics to large glass-melting tanks is both economically and technically attractive. If this new technology can be applied in a continuous operation, as much as 20 percent of the energy required to produce glass articles can be saved. A cursory economic analysis indicates that the successful application of this technology can save between $0.4 million and $9.8 million dollars per year for each glass tank to which it is applied.

To fully establish the proof of concept, two types of testing, scale modeling in viscous oils and crucible experiments in hot glass, are required. Scale modeling allows observation of the occurring phenomena in a medium that is at or slightly above room temperature. The crucible experiments in hot glass help to establish critical variables and material compatibility requirements for introducing this new technology into a continuous glass-melting tank. Hereinafter discussed are the design and results of scale modeling in a viscous oil medium, and a cursory economic analysis based on the results of the experiments. The results are also used to define the requirements for experimentation in crucibles of molten glass.

A typical method according to the present invention for removing gaseous inclusions from a highly viscous liquid containing both inclusions and dissolved gases comprises applying sonic energy in the liquid at an energy intensity sufficient to induce migration and coalescence of the inclusions in the liquid, and less than that required to produce substantial cavitation therein, so as to avoid substantial liberation of dissolved gases (which, as mentioned earlier herein, would take place during cavitation, forming bubbles and thereby increasing the quantity of inclusions needing to be removed); the sonic energy being applied until the volume density of the inclusions has been reduced to a desired level. Typically, the viscosity of the liquid is about 50 to 1000 poise, the energy intensity is about 0.003 to 15 watts per square centimeter, and the frequency of the sonic energy is about 16 Hz to 100 kHz.

The frequency of the sonic energy preferably is selected, and adjusted if necessary, to match the acoustic parameters of the liquid and the container holding it. The source of the sonic energy preferably is selected, and adjusted if necessary, to have an acoustic impedance that substantially matches the acoustic impedance of the liquid at the interface between the source and the liquid.

Typically, the frequency and the energy intensity are selected, and adjusted if necessary, to provide a mode of operation whereby the liquid is subjected to a cyclic component of stress that causes bubbles to collide and form larger bubbles, and to a substantially unidirectional component of stress, due to viscous losses and other mechanisms existing in an acoustic field (e.g. radiation pressure), that tends to drive the growing bubbles away from the source of the sonic energy and thus to facilitate their movement toward the surface of the liquid and the environs.

The invention is especially advantageous where the liquid is molten glass at a temperature of about 1200 to 1500 C., having a viscosity of about 50 to 1000 poise, where the intensity of the sonic energy is about 0.003 to 15 watts per square centimeter, and the frequency is about 16 Hz to 100 kHz. Where the liquid is molten glass, the frequency and the energy intensity typically are selected, and adjusted if necessary, responsive to the dynamic viscosity of the glass and the acoustic impedance at the interface between the source of the sonic energy and the glass, to provide a mode of operation wherein a substantial percentage of the bubbles in the glass migrate upward at rates at least about equal to a rate at which a bubble about 0.4 millimeter in diameter typically rises because of buoyancy through glass at a viscosity of about 100 poise.

DRAWINGS

CARRYING OUT THE INVENTION

Figure 1:
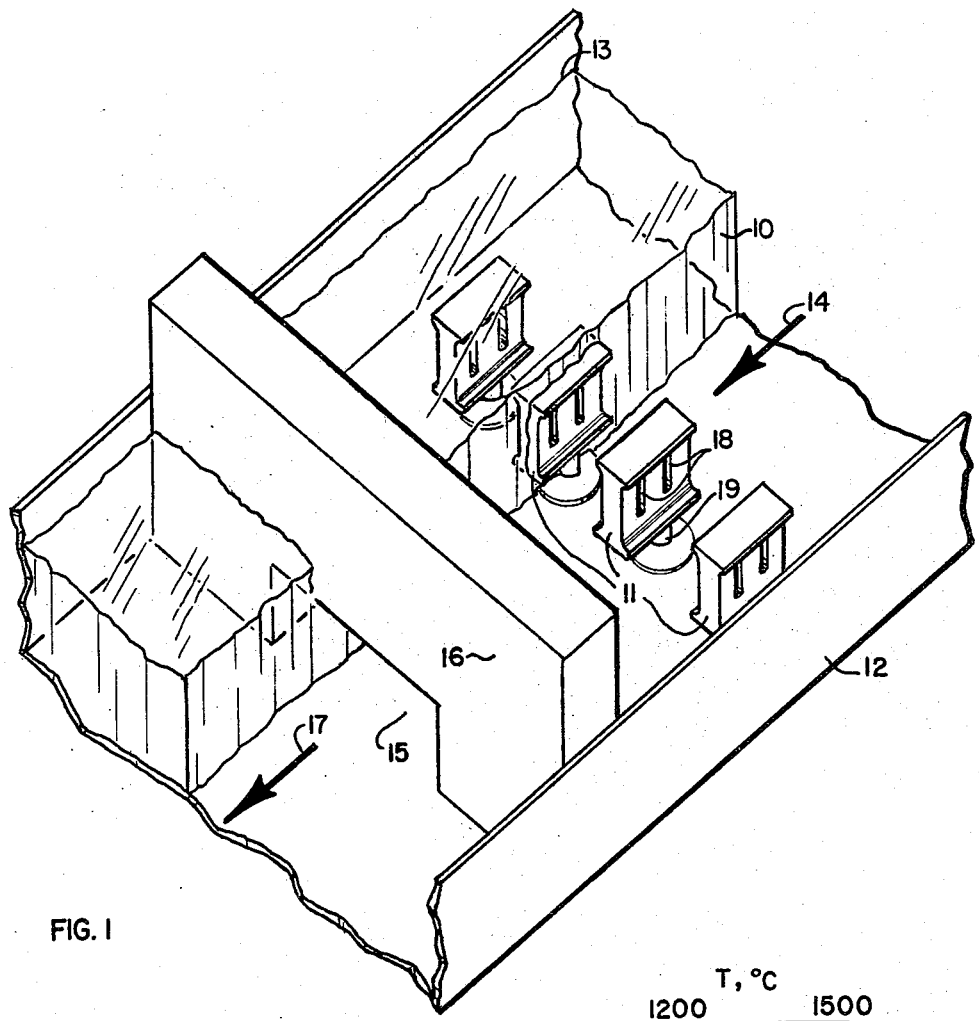
FIG. 1 is a perspective view of typical apparatus used in practicing the present invention.

Referring now to FIG. 1, a typical method according to the present invention for removing gaseous inclusions from a highly viscous liquid 10 comprises applying sonic energy, as by means of horns or any other suitable acoustic source or sources 11, in the liquid 10 at an energy intensity sufficient to induce migration and coalescence of the inclusions in the liquid 10, and less than that required to produce substantial cavitation therein, until the volume density of the inclusions has been reduced to a desired level. Typically, the viscosity of the liquid 10 is about 50 to 1000 poise, the energy intensity at the sources 11 is about 0.003 to 15 watts per square centimeter, and the frequency of the sonic energy is about 16 Hz to 100 kHz.

The frequency of the sonic energy typically is selected, and adjusted if necessary, to match the acoustic parameters of the liquid 10 and the container 12 holding it. The source 11 of the sonic energy typically is selected, and adjusted if necessary, to have an acoustic impedance that substantially matches the acoustic impedance of the liquid 10 at the interface between the source 11 and the liquid 10.

Typically, the frequency and the energy intensity are selected, and adjusted if necessary, to provide a mode of operation whereby the liquid 10 is subjected to a cyclic component of stress that causes bubbles to collide and form larger bubbles, and to a substantially unidirectional component of stress, due to viscous losses and other mechanisms existing in an acoustic field (e.g. radiation pressure), that tends to drive the growing bubbles away from the source 11 of the sonic energy and thus to facilitate their movement toward the surface 13 of the liquid 10 and the environs.

Where the liquid 10 is molten glass at a temperature of about 1200 to 1500 C., having a viscosity of about 50 to 1000 poise, the intensity of the sonic energy preferably is about 0.003 to 15 watts per square centimeter, and the frequency is about 16 Hz to 100 kHz. Where the liquid 10 is molten glass, the frequency and the energy intensity typically are selected, and adjusted if necessary, responsive to the dynamic viscosity of the glass 10 and the acoustic impedance at the interface between the source 11 of the sonic energy and the glass 10, to provide a mode of operation wherein a substantial percentage of the bubbles in the glass 10 migrate upward at rates at least about equal to a rate at which a bubble about 0.4 millimeter in diameter typically rises because of buoyancy through glass at a viscosity of about 100 poise.

Useful and preferred ranges of conditions for practicing the invention are best determined at the present time by applying the results of the experiments described below.

The scale model of a continuous glass-melting tank should be based on a melting unit that produces soda-lime glass, which comprises 85 percent of the total glass production in the United States. This choice of glass composition for developing the model does not limit the present invention because the viscosity and dimensions of the container are the primary factors that establish the efficacy of sonic refining. The viscosity of all glasses is established by their temperature. Therefore, the present invention is applicable to all glasses, regardless of the composition. A typical glass-melting unit cannot be readily defined because of differences that exist among the three major manufacturing segments in the glass industry; container glass (SIC-3221), pressed and blown glass (SIC-3229), and flat glass (SIC-3211). However, a scale model of a continuous glass-melting tank that produces 300 tons/day is considered to be fairly typical. The number of gaseous inclusions per unit volume must remain relatively fixed so that quantification of the results can be established. Therefore, a scale model must have a zone in which the bubble concentration is created in a relatively uniform manner. FIG. 1 represents such a scale model. As is indicated by the arrow 14, the viscous oil 10 enters at the rear. It passes through a zone in which the bubbles are created. The oil 10 flows toward the front of the container 12 and passes over the zone of ultrasonic application (by the acoustic sources 11), which is located in a region that will have a natural upward convection in a glass tank. The oil 10 continues to flow toward the front of the unit and passes through a restriction or throat 15 in a transverse wall 16, a typical construction in a continuous glass-melting tank 12. The oil 10 proceeds forward as is indicated by the arrow 17, and leaves the tank 12 through an over-flow system, beyond the regions shown in FIG. 1, which returns it to the heating and pumping system (not shown).

As a first approximation, a continuous, glass-melting tank can be considered to be a volumetric mixer. For such a model, the change in any glass property, P, can be defined by the following equation:

$$P_{new} = P_{old}[1 - \exp(-t/t_c)]$$

where $$\begin{aligned}
t &= \text{elapsed time from initiation of change} \\
  &\quad (\text{i.e., } t = 0) \\
t_c &= \text{time constant} \\
    &= \frac{\text{volume of glass in tank}}{\text{throughput rate}} \\
    &= \frac{V}{R}.
\end{aligned} \tag{1}$$

If the dimensions of the scale model are a common multiple, S, of the dimensions of a full-sized, continuous, glass-melting tank, then the time constant for the scale model can be established as follows:

$$\begin{aligned}
t_c' &= \text{time constant of the scale model} \\
     &= (t_c)(S) \\
     &= \frac{\text{volume of the model}}{\text{model throughput}} \\
     &= \frac{V'}{R'}.
\end{aligned} \tag{2}$$

With these relationships in hand, any change in throughput that is induced in the model by the application of ultrasonics can be related to the equivalent change in throughput in the full-sized, continuous, glas-melting tank with the following calculations:

$$\begin{aligned}
\text{(a) } t_c'^* &= \text{New model time constant produced from} \\
&\quad \text{new throughput, } R'^* \\
&= \frac{V'}{R'^*} \\
\text{(b) } t_c^* &= \text{new time constant for the glass tank} \\
&= \frac{t_c'}{S} \\
\text{(c) } R^* &= \text{new throughput for the glass tank} \\
&= \frac{V}{t_c^*}
\end{aligned} \tag{3}$$

The new throughput, R*, for the full-sized, continuous, glass-melting tank can be used to establish the expected results from the application of ultrasonic radiation to the full-sized unit.

The typical soda-line, glass-melting tank has dimensions of 50×22×5 ft of glass depth. This tank produces 300 tons/day, approximately 25,000 lb/hr, of glass containers. It has a volume of 5,000 cu ft of a molten glass whose density is 153 lb/cu ft, so that the time constant can be calculated as follows:

$$t_c = \frac{(153 \text{ lb/ft}^3)(5500 \text{ ft}^3)}{25,000 \text{ lb/hr}} \tag{4}$$
$$= 33.66 \text{ hr}.$$

For ease and soundness of construction, the scaling factor should be such that the model can be constructed from standard sheets of clear acrylic plastic. A scaling factor (S) of 0.15 will allow construction on 4 ft×8 ft sheets of this material. Therefore, the scale-model dimensions will be 7.5 ft from the back of the model to the front of the throat, 3.3 ft in width, and 9 in. (0.75 ft) of model-fluid depth—providing a volume, V', of 18.56 cu ft or 138.86 gal. For this model, the time constant and throughput rate are calculated as follows:

$$\begin{aligned}
\text{(a) } t_c' &= (t_c)(S) \\
&= (33.55 \text{ hr})(0.15) \\
&= 5 \text{ hr} \\
\text{(b) } R' &= \frac{V'}{t_c'} \\
&= \frac{138.86 \text{ gal}}{5 \text{ hr}} \\
&= 27.5 \text{ gal/hr} \\
&= 29.02 \text{ cm}^3/\text{sec}.
\end{aligned} \tag{5}$$

As has been previously stated, the number of gaseous inclusions per unit volume must be relatively fixed so that the effect of the ultrasonic application can be quantified. To accomplish this fixation, fritted glass tubes are installed at the input end of the scale model. Compressed, oil-free, air is caused to flow through these tubes at a fixed rate, and since the tubes have a very fine porosity, the gas is broken into many small bubbles. Those bubbles that are large enough to rise from buoyant forces will float to the top, and those that are not will constitute the seed count, the standard industry definition of the number of bubbles per unit volume.

Figure 2:
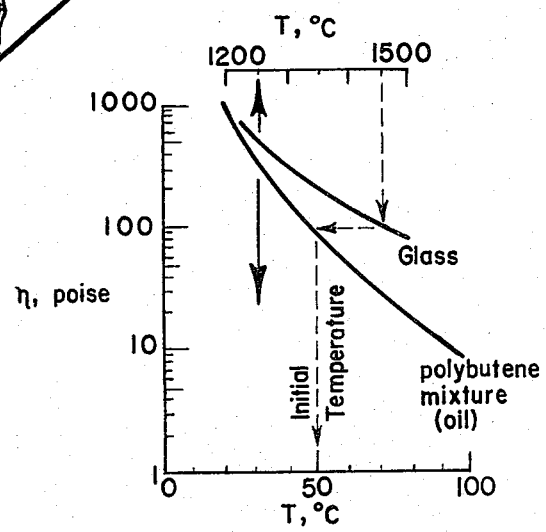
FIG. 2 is a graph of viscosity against temperature for two viscous liquids, illustrating an aspect of the experimental procedures described herein.

The fluid medium that is used in the scale model must simulate the viscosity/temperature relationship for molten, soda-lime glass. The Chevron Oil Company produces a series of polybutenes that can be used for the viscous fluid medium. A volumetric mixture of 60 percent No. 24 polybutene and 40 percent No. 122 polybutene will produce a viscous fluid whose viscosity simulates that of molten soda-lime glass in a temperature range that is within the safe working limits of the plastic used to construct the scale model. FIG. 2 displays the viscosity curves for this fluid mixture and for a soda-lime glass. An emperical equation developed by Fulcher can be used to describe these viscosity curves as follows:

(a) $\text{Log } \eta = -1.493 + \frac{4213.33}{T - 254.12}$ (glass)  (6)

(b) $\text{Log } \eta = -8.570 + \frac{4142.27}{T + 338.81}$ (polybutene mixture)

(c) $\eta$ = viscosity in poise
$T$ = temperature, C.

Economic factors and time determined the choice of the experimental ultrasonic apparatus used during this research program. Four horns 11, designed as shown in FIG. 1, were completely immersed in the fluid bath 10. These ultrasonic horns 11 were designed to influence the surrounding volume as determined by the acoustic properties of the fluid 10 under treatment. The I-beam-like profile provided acoustic continuity that allowed for optimum radiation into the liquid 10 and minimized any abrupt changes in radiating surface area. The curvature also alleviated fatigue stressing of the horn 11. The slots 18 were used primarily to eliminate parasitic vibrational modes that would have reduced the coupling efficiency. Each horn 11 had an effective radiating surface of 170.52 cm$^2$ (26.43 in.$^2$).

Each horn 11 is individually driven at approximately 20 kHz by a magnetrostrictive transducer, which may be of conventional design, suspended from beneath the fluid tank 12 and not visible in FIG. 1. Stud bolts 19 ($\frac{1}{2}$-28) connect the horns 11 to the respective transducers, and a copper washer, inserted between the horn 11 and the transducer, enhances the coupling between the two elements. Water sprays provide cooling for the transducers, and each transducer is rated at 1000 watts at a frequency of 20 kHz. The four transducers are connected in series-parallel pairs. The combined transducers are driven electrically by means of a 2400-watt, electronic, power oscillator. The power supply also includes provision for 20 amperes of d-c bias current (10 amperes through each pair of transducers).

The horns were made of alumnium to provide a system in which the Q, or sharpness of resonance, was determined by the fluid load rather than by the losses in the horns. Stainless steel and other metals also could have been used as horn materials in the model.

The scale model tank 12 was constructed of clear acrylic plastic so that the phenomena occurring could be observed. The viscous fluid 10 overflowed into a tank that contained immersion heaters for temperature control. The plastic model was placed on a wooden frame for structural support and part of that frame enclosed three sides of the model, while the fourth side was enclosed with clear plastic. These enclosures formed a double-wall construction through which warm air was passed to provide some of the heat lost from the viscous medium 10. Both the temperature of the oil 10 leaving the overflow tank and the temperature of the air flowing in the double-walled box were controlled so that the temperature of the viscous oil 10 at the entrance to the throat 15 was maintained at the experimental temperature. A clear plastic cover was also put over the entire surface of the model to prevent contamination from ambient dust and to aid in the retention of heat in the viscous fluid 10.

The measured response during the experimentation was the seed count, N, the number of gaseous inclusions per cubic centimeter. This number was calculated by taking an enlarged photograph (approximately 6×) of a known volume of the viscous fluid 10. The number of bubbles in this volume was counted and divided by the known volume to establish N. A skimming wedge was used to produce a thickness of the viscous medium 10 that was approximately the same as the depth of field of the microscopic system so that all of the seeds in a given depth of oil 10 were seen in one photograph.

The exact experimental procedures are as follows: (1) Establish the temperature of the viscous oil at the entrance to the throat. (2) Establish the required fluid flow rate. (3) Establish the base line seed count with the sonics inactive by photographing and counting seeds at $\frac{1}{2}$-hr intervals. (4) Activate ultrasonics. (5) Photograph and count seeds at $\frac{1}{2}$-hr intervals. (6) Change throat temperature and/or fluid flow. (7) Repeat base-line procedure. (8) Repeat counting procedures with sonics activated.

Two types of results have been obtained from the model experimentation, visual data as evidenced by photographs, and quantitative data as evidenced by seed count. The types of data are important because the visual observations yield proof that the phenomena are working, and the quantitative observations can be used to derive expected benefits. The discussions of the experimental results include observations and data pertinent to the applied ultrasonic intensity, the visual observations, and a statistical treatment of the quantitative data. The conclusions that can be drawn from each of these results also are presented.

For each experimental run, the power-dial setting is approximately 75 percent of full power. The power output from the transducers is estimated from related experimental conditions because it is not proportional to the power-dial setting. The total estimated electrical power to the transducers is approximately 1800 watts. Assuming an electromechanical coupling coefficient of 0.29, corresponding to a value near the high end of reported values for A-nickel and to the biasing conditions used during the experimental program, the estimated ultrasonic power output is approximately 150 watts. However, if a typical value for the coupling factor of 0.14 is assumed, the estimated power radiated into the fluid is 35 watts. Therefore, the estimated intensity of the ultrasonic energy at and near the radiating surfaces of the horns ranges from 0.05 to 0.22 watt/cm$^2$ (0.33 to 1.42 watts/sq in.). Table 1 lists the calculated values of intensities that are required to translate bubbles of various diameters through a distance of $\frac{1}{8}$ wavelength of sound at various frequencies. The listed migration rates are equivalent to the rate caused by buoyancy forces acting on a bubble 0.4 cm in diameter in a glass with a viscosity of 100 poise. According to Table 1, sonic intensities in the range 0.05 to 0.22 watt/cm$^2$ are theoretically required to move a bubble 0.1 cm in diameter at the reference rate in molten glass in which the viscosity ranges from 107.2 to 546 poise. The nearly perfect match between the estimated sonic intensities during experimentation and the theoretically defined sonic intensities is quite encouraging. Therefore, the experimental intensities can be used in estimating the economics of applying ultrasonics to current glass-melting tanks.

The result of the application of ultrasonic energy to the viscous model are visually quite dramatic. A photograph of the area immediately above the sonic horns when the horns are inactive and another photograph of the same area with the horns activated illustrate the effect of the ultrasonic application on the density of the seeds in the viscous medium. With the ultrasonics activated, the horns become clearly visible, and foam lines are established where the spheres of influence of the ultrasonic horns overlap. In a close-up view of an area over the horns the large bubbles that are formed from migration and coalescence of the small seeds can be seen. Such results are usually obtained within 10 or 15 minutes after the application of ultrasonics. Also, localized degassing occurs and the bubbles that are created by this degassing migrate and coalesce as do the bubbles that are originally present.

TABLE 1

CALCULATED VALUES OF INTENSITIES REQUIRED TO TRANSLATE BUBBLES OF RADIUS R IN GLASS THROUGH A DISTANCE OF ⅛-WAVELENGTH AT VARIOUS TEMPERATURES

| Type of Glass | Frequency, Hz | $\eta$ C | Poise | $\alpha$ - Adjusted I, Watts/cm$^2$ | | |
|---|---|---|---|---|---|---|
| | | | | R = 0.05 cm | R = 0.10 cm | R = 0.20 cm |
| Soda/lime/silica | 5000 | 1200 | 914.96 | $2.816 \times 10^{-2}$ | $5.343 \times 10^{-2}$ | $2.502 \times 10^{-2}$ |
| | | 1250 | 546.71 | $1.683 \times 10^{-2}$ | $3.193 \times 10^{-2}$ | $1.495 \times 10^{-2}$ |
| | | 1300 | 343.16 | $1.056 \times 10^{-2}$ | $2.004 \times 10^{-2}$ | $9.38 \times 10^{-3}$ |
| | | 1350 | 224.75 | $0.692 \times 10^{-2}$ | $1.313 \times 10^{-2}$ | $6.14 \times 10^{-3}$ |
| | | 1400 | 152.73 | $0.470 \times 10^{-2}$ | $0.892 \times 10^{-2}$ | $4.18 \times 10^{-3}$ |
| | | 1450 | 107.2 | $0.330 \times 10^{-2}$ | $6.26 \times 10^{-3}$ | $2.93 \times 10^{-3}$ |
| | | 1500 | 77.41 | $0.238 \times 10^{-2}$ | $4.52 \times 10^{-3}$ | $2.12 \times 10^{-3}$ |
| | 10,000 | 1200 | 914.96 | $10.76 \times 10^{-2}$ | $10.01 \times 10^{-2}$ | $0.381 \times 10^{-1}$ |
| | | 1250 | 546.71 | $6.43 \times 10^{-2}$ | $5.98 \times 10^{-2}$ | $0.227 \times 10^{-1}$ |
| | | 1300 | 343.16 | $4.04 \times 10^{-2}$ | $3.75 \times 10^{-2}$ | $0.143 \times 10^{-1}$ |
| | | 1350 | 224.75 | $2.64 \times 10^{-2}$ | $2.46 \times 10^{-2}$ | $0.093 \times 10^{-1}$ |
| | | 1400 | 152.73 | $1.80 \times 10^{-2}$ | $1.67 \times 10^{-2}$ | $0.064 \times 10^{-1}$ |
| | | 1450 | 107.20 | $1.26 \times 10^{-2}$ | $1.17 \times 10^{-2}$ | $4.5 \times 10^{-3}$ |
| | | 1500 | 77.41 | $9.1 \times 10^{-3}$ | $8.5 \times 10^{-3}$ | $3.2 \times 10^{-3}$ |
| | 20,000 | 1200 | 914.96 | 0.400 | $15.2 \times 10^{-2}$ | $12.2 \times 10^{-2}$ |
| | | 1250 | 546.71 | 0.239 | $9.1 \times 10^{-2}$ | $7.3 \times 10^{-2}$ |
| | | 1300 | 343.16 | 0.150 | $5.7 \times 10^{-2}$ | $4.6 \times 10^{-2}$ |
| | | 1350 | 224.75 | 0.098 | $3.7 \times 10^{-2}$ | $3.0 \times 10^{-2}$ |
| | | 1400 | 152.73 | 0.067 | $2.5 \times 10^{-2}$ | $2.0 \times 10^{-2}$ |
| | | 1450 | 107.20 | 0.047 | $1.8 \times 10^{-2}$ | $1.4 \times 10^{-2}$ |
| | | 1500 | 77.41 | 0.034 | $1.3 \times 10^{-2}$ | $1.0 \times 10^{-2}$ |

TABLE 2

EXPERIMENTAL SEED-COUNT DATA FROM ULTRASONIC TREATMENTS

| Treatment: | 1 | 2 | 3 | 4 |
|---|---|---|---|---|
| Viscosity, poise | 129 | 114 | 138 | 121 |
| Flow, g/S | 24.8 | 24.8 | 29.6 | 29.6 |
| Ultrasonics | Inactive | Active | Inactive | Active |
| | 125.98 | 65.24 | 247.18 | 91.63 |
| | 95.23 | 78.74 | 387.81 | 83.10 |
| | 260.97 | 85.49 | 298.32 | 157.68 |
| | 67.49 | 141.73 | 287.66 | 136.37 |
| | 168.73 | 89.99 | 326.24 | 247.18 |
| | 74.24 | 98.99 | 389.94 | 191.77 |
| | 123.74 | 53.99 | 396.33 | 176.86 |
| | 57.49 | 44.99 | 507.14 | 136.37 |
| | 134.98 | 58.49 | 230.12 | 119.32 |
| | 39.25 | — | 313.13 | 172.73 |
| | 85.99 | — | 424.03 | 270.62 |
| | 40.49 | — | 324.12 | 451.74 |
| | 87.73 | — | 426.16 | 187.51 |
| | 80.99 | — | 328.15 | 197.07 |
| | 53.99 | — | 215.21 | 245.05 |
| | 50.74 | — | — | — |
| | 57.49 | — | — | — |
| | 35.49 | — | — | — |
| | 76.49 | — | — | — |
| | 71.94 | — | — | — |
| | 112.49 | — | — | — |
| | 105.73 | — | — | — |
| | 130.48 | — | — | — |
| $\overline{X}$ | 92.85 | 79.74 | 340.12 | 191.00 |
| S | 49.60 | 27.66 | 78.49 | 87.45 |
| n | 23 | 9 | 15 | 15 |

TABLE 3

ANALYSIS OF VARIANCE FOR THE SONIC-TREATMENT EXPERIMENT

| Source | Degree of Freedom | Sum of Squares | Mean Square |
|---|---|---|---|
| Treatments | 3 | 649657 | 216552 |
| Error | 58 | 270594 | 4665 |
| Total | 61 | 920251 | — |

$F = \dfrac{216552}{4665} = 46.416$ $F^* = F(358) (0.9995) = 6.81$ $F > F^* \rightarrow$ Significant treatment effect at 99.95% confidence (0.10% significance)

The quantitative information has been generated by recording the seed counts for two model throughput rates each with and without the sonics activated. Table 2 lists the data from these four treatments. These data are treated statistically by performing the analysis of variance that is shown in Table 3. That analysis clearly demonstrates that the seed count is significantly affected by the four treatments. Duncan's multiple range test has been used to establish significant differences among the four means. That test indicates that the mean seed count for Treatment 3, increased model throughput with ultrasonics inactive, is larger than the mean seed count for Treatment 1, a baseline condition. This result indicates that the model behaves as expected; increasing the throughput increases the seed count. The multiple range test also indicates that the mean seed count for Treatment 3 is greater than that for Treatment 4 in which the sonics have been activated. Therefore, the application of ultrasonics did decrease the seed count between Cases 3 and 4.

The multiple range test indicated that the mean seed count between Treatments 1 and 2 was not significantly different, an expected result in light of the differences that were demonstrated to exist between Treatments 3 and 4. To confirm this result, a simple T-test between the means from Treatments 1 and 2 and a simple F-test between the variations (estimates of standard deviation, $\sigma$) of Treatments 1 and 2 were conducted. The F-test indicated that the variation in Treatment 1 was greater than the variation in Treatment 2 at the 95 percent confidence level (5 percent significance). The appropriate T-test on the sample means indicated that they were not different at 95 percent confidence level (5 percent significance). These results were probably due to the small sample size that was used for Treatment 2. However, these statistical tests indicated that the ultrasonics did have a significant effect in that they reduced the variation in the mean seed count.

APPLICABILITY

The visual observations and statistical data indicate that the application of ultrasonics can decrease both the mean seed count and the variability in that seed count. The experimental results clearly indicate that a 40 percent reduction in seed count can be obtained at a 20 percent throughput increase. However, the mean seed count at the increased throughput rate could not be reduced to a seed count equivalent to that of the baseline throughput rate because the ultrasonic generator had insufficient power. If generator power had been approximately three times greater than it was, the equivalent reduction in seed count at an increased pull would have been achieved.

Maximum efficiency in the application of sonic energy is obtained by designing the system for the application. In the present experimental system, considerable energy has been lost in adapting existing equipment to the experimental conditions. Nevertheless, the mean seed count in the viscous model has been effectively reduced with the application of ultrasonic energy. Producing ultrasonic or sonic energy in a vat of molten glass could make use of the electrical conductivity of the molten glass, because sonic energy can be generated in electrically conductive materials by induction. One of the benefits of methods such as the induction technique is the fact that the material under treatment serves as the transducer, thereby avoiding losses that are associated with coupling from element to element.

The results of the viscous modeling experiments indicate that a 20 percent throughput increase can be obtained by the application of ultrasonics. Therefore, the ultrasonic horn and power generator must be scaled upward for operation in a production-sized glass melter.

The required size of the sonic horn, if a horn similar to those used in the model experiments is used, can be established by dividing the dimensions of the model horn by 0.15, the scaling factor. Experience indicates that a horn of such dimensions is too large because it will be difficult to manufacture and difficult to install and maintain. These problems can be avoided by reducing both the height and depth of the horn by 50 percent. Such a dimensional reduction will reduce the radiating surface to 43 percent of the value for the full-size horn so that nine horns instead of four will be required in production-size glass-melting tanks.

The scale-up of the ultrasonic power source is based on the power that is required to translate a bubble through a distance of $\frac{1}{8}$-wavelength at a rate that is equal to the rate of rise of a bubble 0.4 cm in diameter through a fluid whose viscosity is 100 poise. The full-size horn would require an operational frequency of 3.24 kHz if molybdenum were used as the horn material. The reduced horn that is expected to be used in a production glass melter will operate at a frequency of about 10 kHz with 7,000 watts of input power to each horn. For a glass-melting furnace that operates 24 hours per day for 350 days per year with nine horns per furnace, the energy penalty for the application of ultrasonics is 18,107 Btu's per ton of glass produced; or 0.15 percent of the energy that is currently used to produce soda/lime glass.

In another embodiment of the invention, a suitable radiating surface is extended only slightly into the molten glass from the bottom of the container. In this case, the radiating surface is composed of a suitable material, compatible with the environment of molten glass (e.g. molybdenum possibly coated with crystalline refractory material, if necessary). This radiating surface might be composed of a mosaic of active elements or as a solid surface extending across the container involving an area which is determined by frequency and total acoustic power requirements. Scaling is not a factor with this design and it permits free flow of glass.

The economic analysis of sonic refining as potentially utilized in the glass container and flat glass industries leaves no doubt that this technology will be economically attractive.

In selecting conditions for practing the invention efficiently, to conserve energy, the following techniques and procedures are recommended: (1) Select materials that are compatible with the molten glass. (2) Select the frequency that best suits the depth of glass measured from the face of the radiating surface to the surface of the molten glass. (3) Design the sonic source (a) to match the acoustic impedance of the glass, and (b) to operate at the chosen frequency. (4) Select a proper transducer for energizing the sonic source.

Only a few materials are available which can withstand the stresses developed in horns or other radiating devices required for sonic processing of molten glass. Molybdenum is commonly used as electrodes in processing glass and appears to have suitable characteristics for use in practicing the invention. Ceramic coatings may be applied to the surfaces which are exposed to the glass. In a properly designed system, the stresses at the radiating surface are small compared to those developed, for example, within a resonant horn at the point of maximum stress. The point of maximum stress is located at the node in a uniform bar or in a resonant system which is symmetrical at each end. The low intensity of cavitation that exists in the preferred method of practising the invention is not detrimental to vitreous coatings, if the melting point of these coatings exceeds the temperature of the molten glass.

An additional safeguard may be added by designing coolant passages into the horn or other suitable radiating mechanism to maintain the temperature of the molybdenum at a level commensurate with the stresses developed within the member.

The frequency selection is based upon an ability to produce stress gradients in the molten glass. Acoustic waves are stress waves and, in a resonant system, the stresses vary periodically along the axis. This is the optimum condition for coupling energy from a resonant source into a medium. Therefore, the lowest frequency for optimum transfer of energy is that determined by the velocity of sound in the molten glass and corresponds to a depth between the radiating surface protruding from the bottom of the tank to the surface of the molten glass of one-half wavelength. For various reasons, higher frequencies may be desirable. These frequencies should be chosen to produce multiples of half-wavelengths to an upper limit established by the attenuation of the sound in the molten glass as determined by the kinematic viscosity of the glass.

In the previous experiments, the invention was practised using half-wave horns to energize the molten glass.

Other configurations may include a long, plate-shaped radiating surface mounted through the bottom of the tank by means of a mosaic of driving elements and extending only slightly into the molten glass. There are two aspects of the design of the sonic source (horn, etc.): (1) matching the acoustic impedance to that of the glass and (2) operation at the chosen frequency. These two aspects are somewhat interrelated; i.e. the acoustic impedance is reflected into the acoustic source and must be taken into account in calculating the dimensions of the source so that it can operate efficiently at the chosen frequency.

Fortunately there are many types of transducers from which to choose in practicing the invention. At very low frequencies ranging from 16 to 100 Hz, mechanical transducers (e.g. counter-rotating balanced eccentrics) provide very good sources of acoustic power for processing glass. Also at low frequencies ranging from 16 Hz to approximately 2 kHz, powerful electromagnetic drivers can be used.

At higher frequencies from 2 to 100 kHz, magnetostrictive and piezoelectric transducers can be adapted for use in treating molten glass. In each case cooling is necessary to avoid damaging the transducer elements. Magnetostrictive transducers have an advantage from the standpoint of cooling but the piezoelectric types are more efficient and have certain other electrical advantages.

The simplest method of mounting the elements in the tank is through the bottom using resonant devices which can be mounted at a displacement node. In this way, the system can be installed solidly without significant loss of energy.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of removing gaseous inclusions from a highly viscous liquid containing both inclusions and dissolved gases comprising
applying sonic energy in the liquid at an energy intensity sufficient to induce migration and coalescence of the inclusions in the liquid, and less than that required to produce substantial cavitation therein, so as to avoid substantial liberation of dissolved gases, until the volume density of the inclusions has been reduced to a desired level.

2. A method as in claim 1, wherein the viscosity of the liquid is within the range of about 50 to 1000 poise.

3. A method as in claim 1, wherein the energy intensity is within the range of about 0.003 to 15 watts per square centimeter.

4. A method as in claim 1, wherein the frequency of the sonic energy is within the range of about 16 Hz to 100 kHz.

5. A method as in claim 1, wherein the frequency of the sonic energy is selected, and adjusted if necessary, to match the acoustic parameters of the liquid and the container holding it.

6. A method as in claim 1, wherein the source of the sonic energy is selected, and adjusted if necessary, to have an acoustic impedance that substantially matches the acoustic impedance of the liquid at the interface between the source and the liquid.

7. A method as in claim 1, wherein the frequency and the energy intensity are selected, and adjusted if necessary, to provide a mode of operation whereby the liquid is subjected to a cyclic component of stress that causes bubbles to collide and form larger bubbles, and to a substantially unidirectional component of stress, due to viscous losses and other mechanisms existing in an acoustic field, that tends to drive the growing bubbles away from the source of the sonic energy and thus to facilitate their movement toward the surface of the liquid and the environs.

8. A method as in claim 1, wherein the liquid is molten glass at a temperature within the range of about 1200 to 1500 C., having a viscosity within the range of about 50 to 1000 poise, wherein the intensity of the sonic energy is within the range of about 0.003 to 15 watts per square centimeter, and the frequency is within the range of about 16 Hz to 100 kHz.

9. A method as in claim 1, wherein the liquid is molten glass, and the frequency and the energy intensity are selected, and adjusted if necessary, responsive to the dynamic viscosity of the glass and the acoustic impedance at the interface between the source of the sonic energy and the glass, to provide a mode of operation wherein a substantial percentage of the bubbles in the glass migrate upward at rates at least about equal to a rate at which a bubble about 0.4 millimeter in diameter typically rises because of buoyancy through glass at a viscosity of about 100 poise.

* * * * *